UNITED STATES PATENT OFFICE.

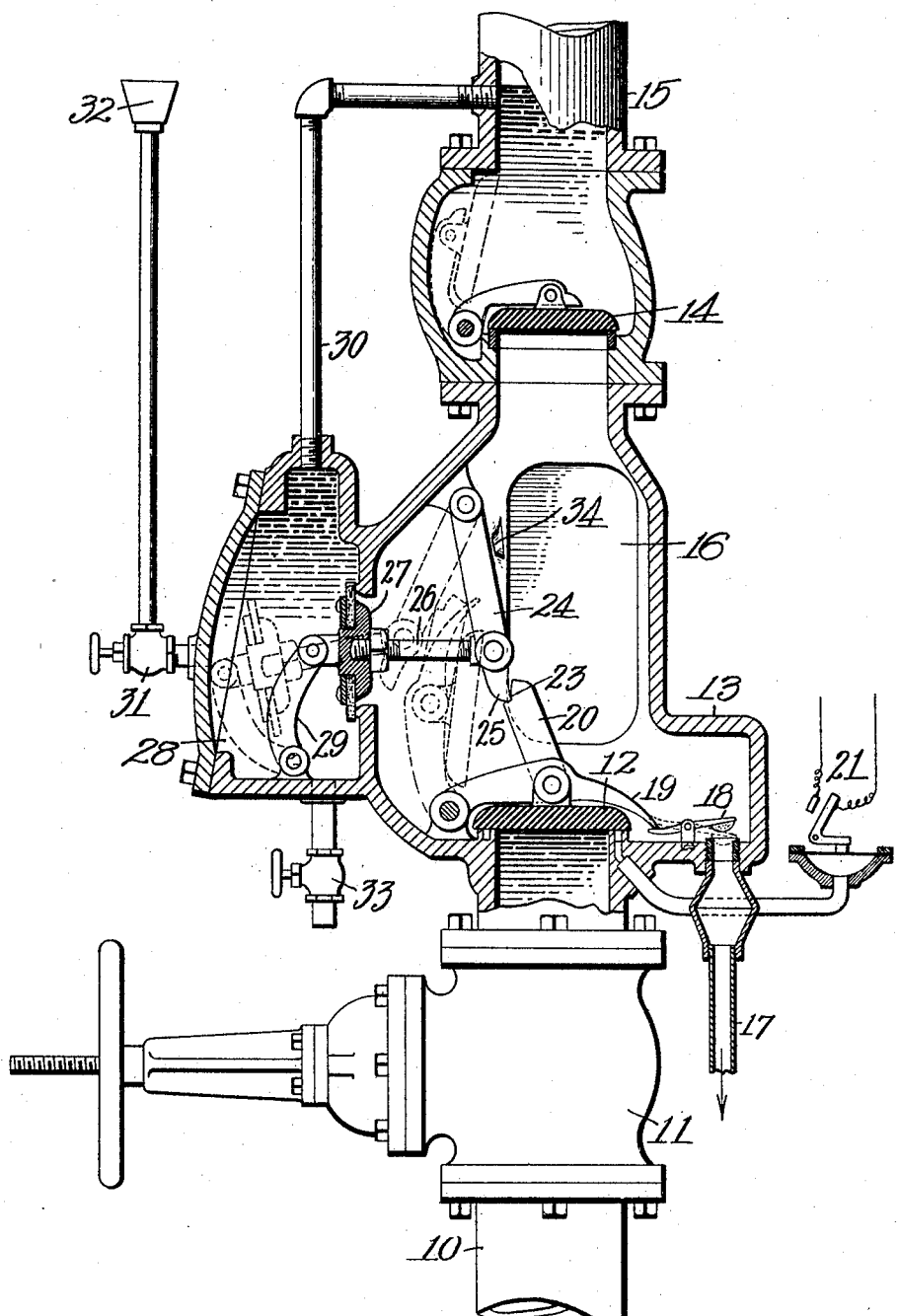

GEORGE I. ROCKWOOD, OF WORCESTER, MASSACHUSETTS.

DRY-PIPE VALVE.

1,397,704.   Specification of Letters Patent.   Patented Nov. 22, 1921.

Application filed July 2, 1917. Serial No. 178,100.

*To all whom it may concern:*

Be it known that I, GEORGE I. ROCKWOOD, a citizen of the United States, residing at Worcester, in the county of Worcester and State of Massachusetts, have invented a new and useful Dry-Pipe Valve, of which the following is a specification.

This invention relates to improvements in that type of differential dry pipe valves for fire extinguisher systems in which the valve that controls the supply of water is held to its seat normally by air pressure applied in an indirect manner.

The principal objects of this invention are to provide an improved indirect leverage system operated by a valve controlled by the air pressure for holding the supply valve to its seat, the same being located out of the path of flow of the water to the distributing pipe so that the flow of water is not restricted and the friction is reduced to a minimum; to provide a leverage system having a relatively great leverage and effecting an absolute breakage of the joint when the supply valve opens so that the parts are effectually disassociated and cannot be reset accidentally or tampered with from the outside; to provide a construction in which a water seal is provided for the air controlled valve and one in which there are no sliding or reciprocating parts that would require bearings or guides in the casing and no external moving connections or parts projecting through the casing, and in which all the mechanism is located within the valve casing. Further objects and advantages of the invention will appear hereinafter.

Reference is to be had to the accompanying drawing which is a central sectional view of a dry pipe valve constructed in accordance with this invention, showing the normal closed position of the parts in full lines and the open position dotted.

The invention is shown as applied to a sprinkler system having a water supply main 10 provided with the usual hand operated controlling valve casing 11 and with an automatic valve 12 for controlling the supply of water out of the stand-pipe 10. This valve is mounted within a valve casing 13 which is connected by a check valve 14 with the air pipe 15 which is connected to the sprinkler heads and in which air is maintained at a definite pressure as is usual in this class of systems. This pipe 15, as usual, acts as the distributing main for supplying the sprinkler heads. In the summer this system can be used as an ordinary water system and one of its advantages consists in the fact that an ordinary hydraulically operated circuit closer 21 can be controlled by it. For this purpose the seat for the valve is shown as provided with a water groove connected with the circuit closer for giving a signal in case of water column.

The casing 13 is provided with an opening closed by a plate 16 which has to be removed in order to get into the interior and set the parts. It is also provided with a drain pipe 17 controlled by a valve 18 normally held open by an arm 19 adapted to swing with the valve 12 about its pivot. When the valve 12 is closed the valve 18 is held open so that any water in the casing can drain out and so that the air inside will remain at atmospheric pressure.

A strut arm 20 is pivoted on the valve 12 and arranged to project upwardly therefrom. This arm is provided with a bearing at 23 and the valve 12 is kept closed under normal conditions by a lever 24 pivoted inside the casing and having an end 25 adapted to engage this bearing 23 so that the parts 24 and 20 constitute a toggle joint. The lever 24 is connected by a pivoted stem 26 with a flexible air valve 27 adapted to close an opening between the main chamber of the casing 13 and an auxiliary chamber 28. This valve and stem 26 are fixedly mounted with respect to each other and pivoted to a link 29 which is also pivoted at the bottom of the auxiliary chamber 28 in such position that when the valve opens it will stay open by the force of gravity.

A fixed stop is provided for the lever 24 shown as consisting of a lug 34 cast on the inside of the valve casing 13. This is located in such position as to prevent the toggle joint coming to a perfectly straight line. It always keeps the central pivot of this joint, the end of the lever 24, slightly to the left of the line of the two end pivots. This is merely an additional safety device, for the valve 27 itself prevents the toggle being set beyond the center.

The chamber 28 is connected by a pipe 30 with the air pipe 15, and in this way when the valve 27 is closed it always has the normal air pressure behind it to keep it closed. It is to be observed that the main valve chamber 13 is normally at atmospheric pressure, any air that can get into it having a free escape to the atmosphere through the pipe 17. The same, of course, is true of any water that may leak into the chamber 13 or that may be left in it after the valve operates.

Although the device will operate with only air pressing directly behind the valve 27, I prefer to fill this auxiliary casing with water to seal this valve, and for that purpose I provide a valved inlet 31 with a funnel 32 above it. This arrangement is provided so that there can be no danger of introducing water into this casing and through the pipe 30 up into the pipe 15 high enough to produce sufficient hydrostatic head to hold the valve 12 shut against the pressure in the pipe 10. A valved drain 33 is also shown for completely emptying this auxiliary casing if desired.

In operation with the parts set as shown in full lines in the drawing, the air pressure acts through the water in the auxiliary casing on the back of the valve 27 and this pressure is multiplied materially through the toggle joint so as to hold the valve 12 down on its seat against the water pressure below. Now if the pressure in the pipe 15 is reduced through the opening of a sprinkler valve in the system, the pressure behind the valve 27 is correspondingly reduced at once. The constantly acting pressure on the bottom of the valve 12 will speedily overcome the resistance offered by the pressure on the valve 27 as it is transmitted to the valve 12 and throw the latter open. The two ends at 23 and 25 rock about each other and the strut 20 forces the lever 24 back about the end of the lever 24 as a pivot. This swings the end 25 off the bearing 23 as shown in dotted lines, swings the valve 27 into a non-return position, and also permanently disengages the parts 20 and 24 so that by no subsequent movement of the valve 12 can these parts be restored to their normal position as shown in full lines.

The relationship between the end 25 of the lever 24 and the bearing 23 is such that ordinary water hammer may cause these parts to swing slightly but will not disengage them; so after water hammer they are always brought back to the position shown in full lines. The valve 27 can yield slightly for this purpose without unseating. On account of the stop 34 there is no danger of being able to correctly assemble the parts of the dry pipe valve if not correctly built. It will be understood, moreover, that as no parts project outside the casing it is necessary to remove the plate 16, which can be located anywhere around the casing, in order to reset the parts after the valve has been opened. It is to be seen also that there is no air pressure on the top of the water supply valve 12 normally; that the mechanism is all located inside the valve casing 13 and its auxiliary chamber 28; no parts projecting outside to permit of tampering with the device when it is in its normal condition or after it has been set off; that only a low friction opposes the flow of water, the direction of which is straight through the casing; that there are no sliding or reciprocating parts, and no guides in the casing; and that a great leverage is provided by the construction shown so that it can be operated with comparatively low air pressure.

Although I have illustrated and described only a single form of the invention I am aware of the fact that many modifications can be made therein by any person skilled in the art without departing from the scope of the invention as expressed in the claims. Therefore I do not wish to be limited to all the details of construction and the relative location of parts herein shown and described, but what I do claim is—

1. In a fire extinguisher system, the combination of a supply pipe for water and an air pipe, of a valve for closing the supply pipe, a casing surrounding said valve and connecting said pipes, an air check valve, a toggle joint construction having two coöperating members acting on the supply valve to hold it closed when the toggle joint is straightened out, said two members having two portions which removably engage each other, and means independent of the check valve, whereby when the pressure in said air pipe is reduced said joint will be broken, whereby the two parts will become effectively disassociated.

2. In a fire extinguisher system, the combination of a supply pipe for water and an air pipe, of a valve for closing the supply pipe, a casing surrounding said valve and connecting said pipes, a valve for closing the air pipe, a toggle joint construction having two coöperating members connected with one of the valves, said two members engaging each other, independent means for preventing the toggle joint from passing into a position to entirely straighten out to full length, and means on the other side of the toggle joint whereby when the pressure in said air pipe is reduced the joint will be broken, whereby the two parts will become effectively disassociated.

3. In a fire extinguisher system, the combination with a supply pipe for water, an air pipe, and a valve for closing the air pipe, of a valve casing between said pipes, an arm mounted on the valve, a valve normally held to its seat by the air pressure from said air pipe and having a stem thereon, and a lever within the casing and connected with said stem and having an end adapted to engage said arm for holding the first named valve on its seat when the last valve is seated, whereby when the pressure is removed and the last named valve is unseated, the lever and arm will separate and become permanently disengaged.

4. In a fire extinguisher system, the combination of a supply pipe for water and an air pipe, of a valve for closing the supply pipe, a casing surrounding said valve and connecting said pipes, a valve for closing the air pipe, a toggle joint construction having two coöperating members, one pivoted on the supply valve and the other acting on the air pipe valve, said two members having respectively a notch and projection which engage each other, and means for breaking the joint when the pressure in said air pipe is reduced, whereby the two parts will become effectively disassociated.

5. In a fire extinguisher system, the combination of a supply pipe for water and an air pipe, of a valve for closing the supply pipe, a casing surrounding said valve and connecting said pipes, a pivot fixed within said casing, a toggle joint construction having two coöperating members, one pivoted on said pivot and the other on the valve, said two members having respectively a notch and projection which engage each other, means for preventing the toggle joint from passing into a position to entirely straighten out to full length, and means on the other side of the toggle joint whereby the joint will be broken when the pressure in said air pipe is reduced, whereby the two parts will become effectively disassociated.

6. In a fire extinguisher system, the combination with a supply pipe for water, an air pipe, and a valve for closing the air pipe, of a valve casing between said pipes, an arm mounted on the valve and having a notch, a valve normally held to its seat by the air pressure from said air pipe and having a stem thereon, and a lever pivoted within the casing and connected with said stem and having an end adapted to engage said notch for holding the first named valve on its seat when the last valve is seated, whereby when the pressure is removed and the last named valve is unseated, the lever and arm will separate and become permanently disengaged.

In testimony whereof I have hereunto affixed my signature.

GEORGE I. ROCKWOOD.